United States Patent
Park et al.

(10) Patent No.: US 7,225,983 B2
(45) Date of Patent: Jun. 5, 2007

(54) INTELLIGENT PARCEL MONITORING AND CONTROLLING APPARATUS AND METHOD AND TERMINAL FOR EXECUTING REAL-TIME PARCEL PICKUP AND DELIVERY AND OPERATION METHOD THEREOF

(75) Inventors: Jeong-Hyun Park, Daejon (KR); Jin-Suk Kim, Daejon (KR); Hye-Kyu Kim, Daejon (KR); Jiyoung Choi, Daejon (KR); Hoon Jung, Daejon (KR)

(73) Assignee: Electronics and Telecommunications Research Institute (KR)

( * ) Notice: Subject to any disclaimer, the term of this patent is extended or adjusted under 35 U.S.C. 154(b) by 354 days.

(21) Appl. No.: 10/916,874

(22) Filed: Aug. 11, 2004

(65) Prior Publication Data

US 2005/0199717 A1 Sep. 15, 2005

(30) Foreign Application Priority Data

Mar. 12, 2004 (KR) .................... 10-2004-0016833

(51) Int. Cl.
*G06F 19/00* (2006.01)
*G06Q 30/00* (2006.01)
*G06Q 90/00* (2006.01)

(52) U.S. Cl. ...................... 235/385; 705/406
(58) Field of Classification Search ............... 235/385, 235/375, 487, 384; 705/22, 406, 407
See application file for complete search history.

(56) References Cited

U.S. PATENT DOCUMENTS

| | | | | |
|---|---|---|---|---|
| 5,925,864 A | * | 7/1999 | Sansone et al. | 235/375 |
| 5,984,174 A | * | 11/1999 | Kato et al. | 235/375 |
| 6,285,916 B1 | * | 9/2001 | Kadaba et al. | 700/222 |
| 6,373,012 B1 | * | 4/2002 | Crutchfield et al. | 209/584 |
| 6,385,504 B1 | * | 5/2002 | Pintsov et al. | 700/226 |
| 7,003,376 B2 | * | 2/2006 | Witmond et al. | 700/225 |
| 2003/0189090 A1 | * | 10/2003 | Holden | 235/375 |
| 2003/0191651 A1 | * | 10/2003 | Hungerpiller et al. | 705/1 |
| 2003/0227392 A1 | * | 12/2003 | Ebert et al. | 340/825.49 |
| 2003/0236688 A1 | * | 12/2003 | Kadaba et al. | 705/6 |
| 2006/0058914 A1 | * | 3/2006 | Dearing | 700/219 |
| 2006/0149413 A1 | * | 7/2006 | Perez et al. | 700/213 |

FOREIGN PATENT DOCUMENTS

| | | |
|---|---|---|
| JP | 11-031177 | 2/1999 |
| JP | 2002-049664 | 2/2002 |
| KR | 010045472 A | 6/2001 |
| KR | 010087033 A | 9/2001 |
| KR | 1020010098275 A | 11/2001 |
| KR | 2002-0061262 | 7/2002 |

OTHER PUBLICATIONS

Sam R. Thangiah et al., "Heuristic Approaches To Vehicle Routing With Backhauls and Time Windows", Computers Ops Res. vol. 23, No. 11, pp. 1043-1057, 1996 Elsevier Science Ltd.
Gunther Zapfel et al., "Planning and Optimization of hub-and-spoke transportation networks of cooperative third-party logistics providers", Int'l Journal of Production Economics, 78 (2002) 207-220 (2002 Elsevier Science B.V.
Post-Expo Conference Programme "The 7th Int'l postal technology exhibition and world congress" Oct. 7/8/9, 2003(13 pp.).

* cited by examiner

*Primary Examiner*—Thien M. Le
*Assistant Examiner*—Edwyn Labaze
(74) *Attorney, Agent, or Firm*—Blakely Sokoloff Taylor & Zafman (57) ABSTRACT

Provided are an intelligent parcel monitoring and controlling apparatus for real-time pickup and delivery, a method thereof, a terminal for the intelligent parcel monitoring and controlling apparatus, and a method for operating the terminal. The apparatus can correct address errors, generate optimum pickup/delivery sequences, and monitor the pickup and delivery in postal or door-to-door parcel delivery services. The intelligent parcel monitoring and controlling apparatus includes: an address correcting unit for acquiring correct pickup and delivery addresses; a planned sequence generating and managing unit for generating and managing an optimum pickup and delivery sequence; a terminal monitoring and controlling unit for transmitting pickup and delivery information; a monitoring unit for displaying monitoring information which is obtained based on the pickup and delivery state information and the location information; and an information storing and managing unit for storing and managing information related to pickup and delivery.

14 Claims, 10 Drawing Sheets

INTELLIGENT PARCEL MONITORING AND CONTROLLING APPARATUS AND METHOD AND TERMINAL FOR EXECUTING REAL-TIME PARCEL PICKUP AND DELIVERY AND OPERATION METHOD THEREOF

FIELD OF THE INVENTION

The present invention relates to an intelligent parcel monitoring and controlling apparatus for real-time pickup and delivery, a method thereof, a terminal for the intelligent parcel monitoring and controlling apparatus, and a method for operating the terminal. More particularly, the present invention provides an intelligent parcel monitoring and controlling apparatus that can correct address error in post parcel delivery service or a door-to-door delivery service in which parcels are picked up and delivered, generate an optimum pickup and delivery sequences, set up a pickup and delivery plan by controlling the sequences, pick up and deliver parcels based on addresses provided by a Geographical Information (GIS) system, and monitor the status of pickup and delivery in real-time; and it provides a method thereof, a terminal for the intelligent parcel monitoring and controlling apparatus, and a method for operating the terminal.

DESCRIPTION OF RELATED ART

Recently, the amount of parcels is increasing drastically by 30 percent every year due to buoyant electric commercial transaction and local and overseas door-to-door parcel delivery service providers offer customer-oriented services, such as on-time delivery, parcel tracking, and real-time response to pickup request from customers.

The parcel delivery service providers are putting their efforts to improve their variable and extensive work environment, overcome the limit of physical labor, and bring in information-oriented work process and tracing and tracking technology to thereby improve customer service, enhance competitiveness and reduce costs. Quick and accurate pickup and delivery and economical efficiency are prerequisite for postal mail and parcel services and door-to-door parcel delivery services to provide customers with high quality of service and survive the global business age of the 21st century.

Figure 2:
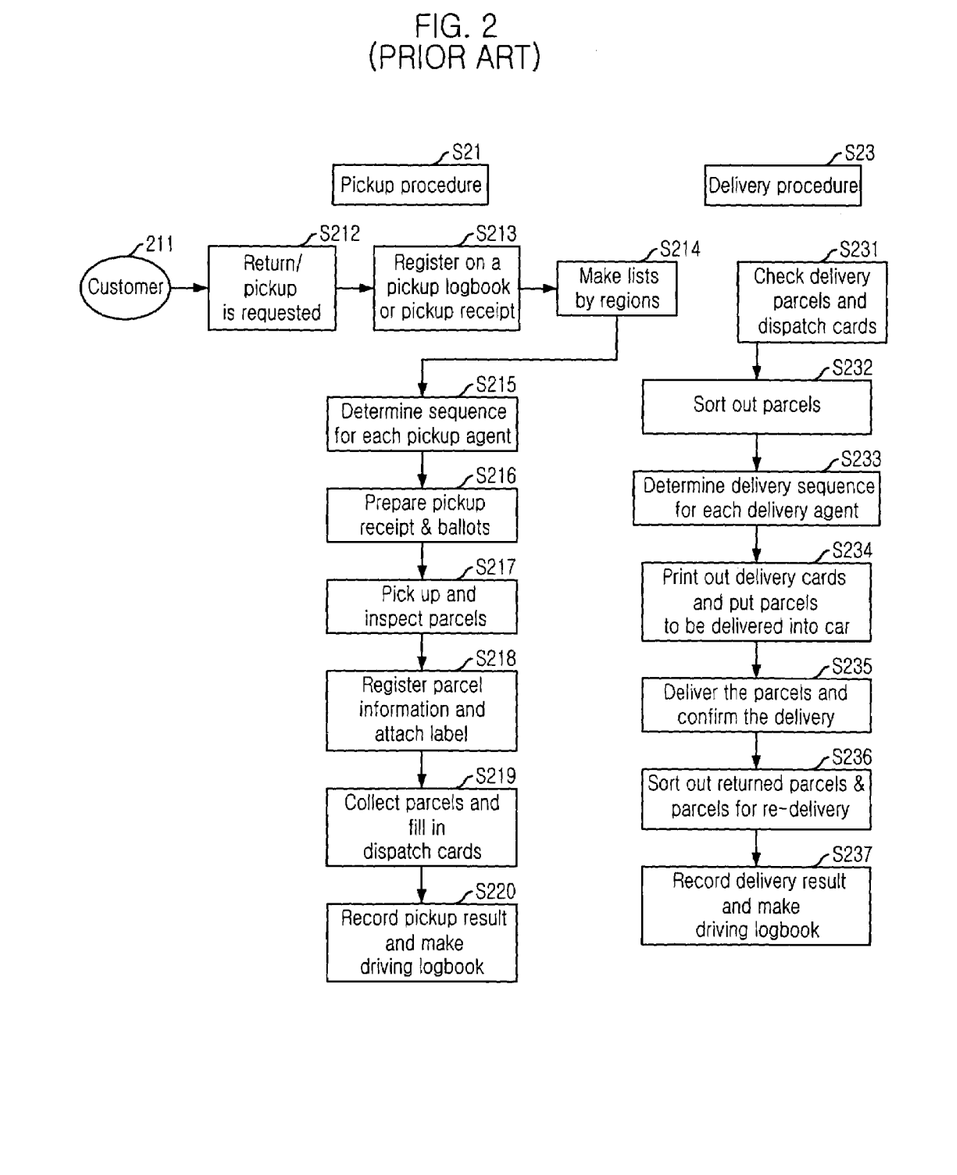
FIG. 2 is a flowchart showing a conventional method for picking up and delivering postal mail and parcels according to prior art.

FIG. 2 is a flowchart showing a conventional method for picking up and delivering postal mail and parcels according to prior art. As shown in FIG. 2, the conventional mail and parcel pickup and delivery process is divided largely into a pickup procedure S21 and a delivery procedure S23.

First, to have a look at the pickup process S21, at step S212, parcel return or pickup requests are made by customers 211. At step S213, the return/pickup request is registered on a pickup logbook and pickup receipts. At step S214, lists are made by regions and, at step S215, a pickup sequence is determined for each pickup agent.

At step S216, pickup receipts and ballots are prepared and, at step S217, parcels are picked up and inspected. At step S218, parcel information is registered and labels are attached to the parcels. At step S219, parcels are collected and dispatch cards are filled in. At step S220, pickup result on a logbook and a driving logbook is recorded.

Subsequently, the delivery procedure 23 is described hereafter. At step S231, parcels and dispatch cards are checked and, at step S232, parcels are sorted out. At step S233, delivery sequences are determined for each delivery agent. At step S234, delivery cards are printed out and parcels to be delivered are put into a delivery car. At step S235, parcel delivery is executed and confirmed. At step S236, returned parcels and parcels for re-delivery are sorted out and, at step S237, delivery result is recorded on a logbook and driving logbook is made.

As described above, most of the conventional parcel pickup and delivery processes are performed manually largely based on experience. Even though an information processing system for parcel pickup and delivery system is developed, the system falls behind the real situation of the parcel pickup and delivery which is executed with intensive and physical labor. So, it is difficult to apply such developed systems to actual business.

In this respect, a parcel delivery information system can be feasible only when it is developed through more accurate field analysis and reflection of the opinion of pickup and delivery agents.

Conventional delivery management systems include Shipping System adopted by the United States Postal Service (USPS) and OK solution developed and operated by Hansol company. However, these systems do not provide a real-time pickup and delivery technology that the pickup agents can apply easily on the spot. They also do not provide addresses for pickup and delivery based through the GIS and they cannot inform customers of the status of pickup and delivery through real-time pickup and delivery information processing and monitoring. In addition, none of the conventional systems provide a function of automatic correction of pickup and delivery address errors, a core function that is important in pickup and delivery service, and a function of automatic generation of pickup and delivery sequences, a temporal element that is also very important in the pickup and delivery service.

SUMMARY OF THE INVENTION

It is, therefore, an object of the present invention to provide an intelligent parcel monitoring and controlling apparatus for real-time parcel pickup and delivery, and a method thereof. The intelligent parcel monitoring and controlling apparatus can correct address error in post parcel delivery service or a door-to-door delivery service, generate an optimum pickup and delivery sequence, and monitor the status of pickup and delivery in real-time.

It is another object of the present invention to provide a terminal for executing the real-time parcel pickup and delivery, and a method for operating the terminal.

In accordance with an aspect of the present invention, there is provided an intelligent parcel monitoring and controlling apparatus for monitoring and controlling parcel delivery in real-time, including: an address correcting unit for acquiring correct pickup and delivery addresses by determining whether the pickup and delivery addresses have an error; a planned sequence generating and managing unit for generating and managing an optimum pickup and delivery sequence in the form of Geographical Information System (GIS) data based on the correct pickup and delivery addresses acquired in the address correcting unit; a terminal monitoring and controlling unit for transmitting pickup and delivery information which includes the amount pickup and delivery parcels, pickup and delivery sequences, pickup and delivery addresses and requested time to a terminal of a pickup/delivery agent and receiving pickup and delivery state information and location information from the terminal, the terminal monitoring and controlling unit being connected to the terminal through a communication network; a monitoring unit for displaying monitoring information which is obtained based on the pickup and delivery state information and the location information that are transmitted from the terminal along with geographical information of a region where the terminal is located; and an information storing and managing unit for storing and managing information related to pickup and delivery which includes door-to-door delivery information, planned sequence information, vehicle tracing information, work processing information, GIS information including map information, road information and address information, and vehicle information.

In accordance with another aspect of the present invention, the apparatus further includes: an external system connecting unit for receiving pickup and delivery amount information including address, registration number, and requested time from an external system and transmitting pickup and delivery result information to the external system; and an operation unit for providing a user with a function of operating the intelligent parcel monitoring and controlling apparatus by operating and managing a system so that the user cane access to data and acquire desired data.

In accordance with another aspect of the present invention, there is provided a terminal for executing pickup and delivery in real-time, including: a terminal pickup and delivery managing unit for transmitting pickup and delivery state information and location information inputted by a pickup/delivery agent to an intelligent parcel monitoring and controlling apparatus through a wireless communication network, receiving pickup and delivery command information including the amount of pickup and delivery, pickup and delivery sequences, address, and requested time from the intelligent parcel monitoring and controlling apparatus, displaying pickup and delivery sequences on a GIS, and managing and displaying Global Positioning System (GPS) data and GIS data; and a terminal pickup and delivery information storing/managing unit for storing and managing pickup and delivery related information including pickup and delivery state information, location information, command information, and GIS information.

In accordance with another aspect of the present invention, there is provided an intelligent parcel monitoring and controlling method for monitoring and controlling parcel pickup and delivery in real-time, including the steps of: a) storing information used for parcel pickup and delivery; b) correcting an address error; c) generating optimum pickup and delivery sequences; d) transmitting pickup and delivery command information to a terminal of a pickup/delivery agent; e) receiving pickup and delivery state information and location information from the terminal; f) monitoring parcel pickup and delivery in real-time; and g) storing pickup and delivery state information.

In accordance with another aspect of the present invention, there is provided a method for operating a terminal for executing parcel pickup and delivery in real-time, including the steps of: a) storing information used for parcel pickup and delivery; b) receiving pickup and delivery command information from an intelligent parcel monitoring and controlling apparatus; c) displaying the pickup and delivery command information; d) displaying pickup and delivery location information and optimum sequence information on a Geographical Information System (GIS); e) transmitting pickup and delivery state information and location information based on the execution of parcel pickup and delivery to the intelligent parcel monitoring and controlling apparatus; and f) storing pickup and delivery result information.

In accordance with another aspect of the present invention, the method further includes the step of: g) if there is no optimum sequence information, acquiring delivery information including delivery address and requested delivery time by scanning a bar code attached to a parcel and receiving a delivery sequence from a user.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
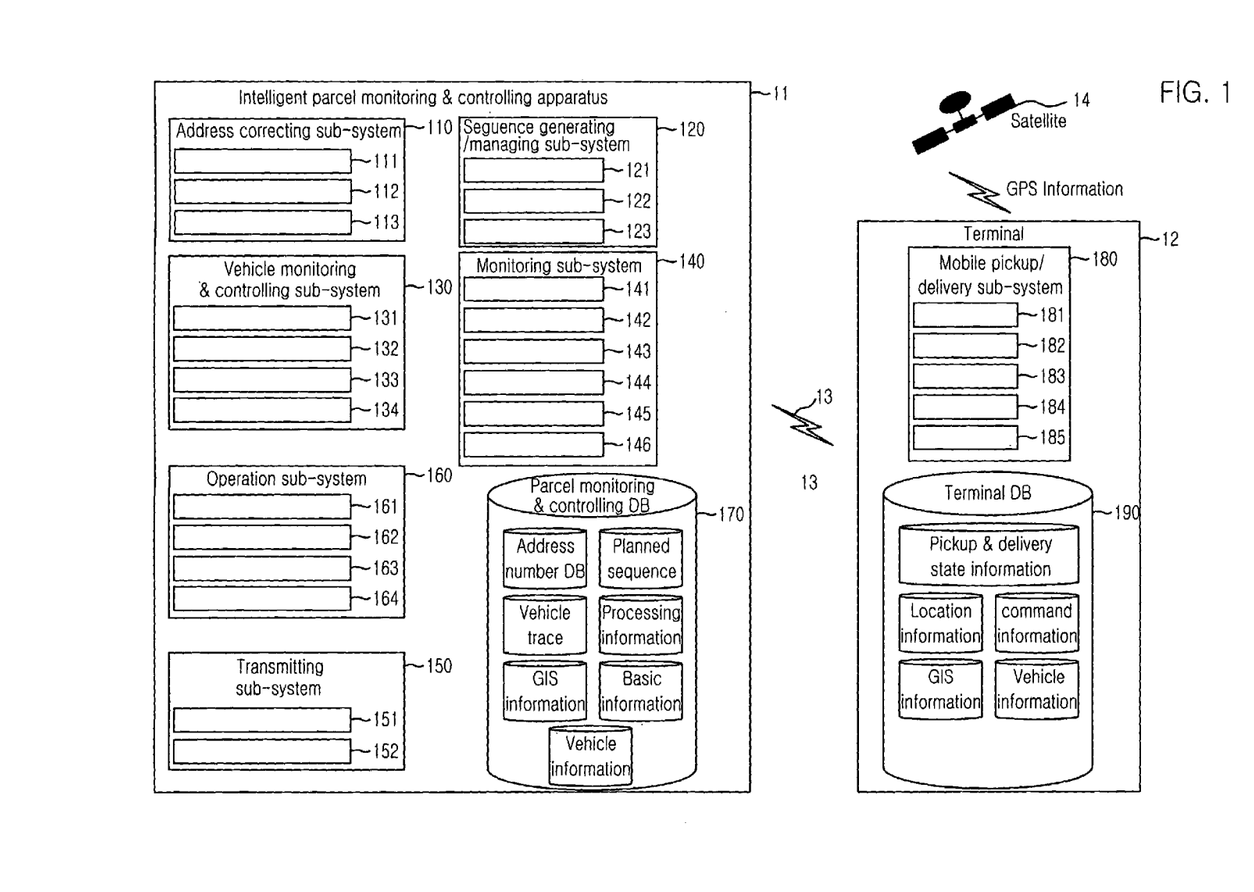
FIG. 1 is a diagram illustrating an intelligent parcel monitoring and controlling apparatus for executing real-time parcel pickup and delivery and a terminal using the intelligent parcel monitoring and controlling apparatus in accordance with an embodiment of the present invention.

FIG. 1 is a diagram illustrating an intelligent parcel monitoring and controlling apparatus for executing real-time parcel pickup and delivery and a terminal using the intelligent parcel monitoring and controlling apparatus in accordance with an embodiment of the present invention. The terminal includes a Personal Data Assistant (PDA) and other functional equivalents thereof.

As shown, the intelligent parcel monitoring and controlling apparatus 11 and the terminal 12 are operated in connection with a wireless communication network 13 for supporting communication between the two devices and a Global Positioning System (GPS) satellite 14 for providing GPS information.

The intelligent parcel monitoring and controlling apparatus 11 includes an address correcting sub-system 110, a sequence generating/managing sub-system 120, a vehicle monitoring and controlling sub-system 130, a monitoring sub-system 140, a transmitting sub-system in connection with an external system, an operation sub-system 160, and a parcel monitoring and controlling database 170.

The address correcting sub-system 110 determines whether there is an error in the pickup and delivery addresses. The planned route sub-system 120 generates and manages the optimum pickup and delivery sequences based on Geographical Information System (GIS) data.

The vehicle monitoring and controlling sub-system 130 is connected with the terminals of picking and delivery agents through a wireless communication network. It transmits pickup and delivery command information including the amount of parcels to be picked up or delivered, pickup and delivery sequences, addresses, required time and the like to the terminals, such as PDA, and receives information of pickup and delivery status and location information from the terminal.

The monitoring sub-system 140 displays monitoring information with a map image of the region based on the pickup and delivery state information and location information transmitted from the terminal, such as PDA. The transmitting sub-system 150 receives pickup and delivery amount information including addresses, parcel registration number and time requested, from an external system and returns pickup and delivery result information to the external system.

The operation sub-system 160 provides operation functions of the intelligent parcel monitoring and controlling apparatus so that a user can operate and manage the intelligent parcel monitoring and controlling apparatus and obtain desired data. The parcel monitoring and controlling database 170 stores and manages information related to pickup and delivery, such as delivery information, planned sequence information, vehicle tracing information, work process information, vehicle information, and GIP information including map information, road information and address information.

The terminal 12 includes a mobile pickup/delivery sub-system 180 and a terminal database 190. The mobile pickup/delivery sub-system 180 transmits information on the state of pickup and delivery performed by pickup and delivery agents, which is referred to as pickup and delivery state information, to the intelligent parcel monitoring and controlling apparatus through the wireless communication network in real-time, receives pickup and delivery command information including the amount of pickup and delivery, sequences, addresses, requested time and the like, from the intelligent parcel monitoring and controlling apparatus, displays pickup and delivery sequence information based on the GIS, and manages and displays GPS information and GIS information. The terminal database 190 stores and manages information related to pickup and delivery, which is referred to as pickup and delivery-related information hereinafter.

The address correcting sub-system 110 includes an address input/output module 111, an address error correcting module 112, and a look-up table module 113. The address input/output module 111 receives pickup and delivery addresses and outputs corrected addresses. The address error correcting module 112 determines whether there is an error in the pickup and delivery addresses inputted through the address input/output module 111 and obtains corrected addresses. The look-up table module 113 manages information that is used as standard for determining address error in the address error correcting module 112.

The sequence generating/managing sub-system 120 includes a planned sequence generating module 121, a planned sequence managing module 122, and a planned sequence basic information module 123. The planned sequence generating module 121 generates the optimum pickup and delivery sequence based on the inputted pickup and delivery addresses, distance, and requested pickup and delivery time. The planned sequence managing module 122 manages the optimum pickup and delivery sequence generated in the planned sequence generating module 121 and the actual pickup and delivery sequences. The planned sequence basic information module 123 stores and manages pickup and delivery addresses, GIS information, and requested pickup and delivery time that are required to generate the planned sequence in the planned sequence generating module 121.

The vehicle monitoring and controlling sub-system 130 includes a vehicle managing module 131, a GIS system module 132, a vehicle monitoring and controlling basic information module 133, and a vehicle terminal interface module 134. The vehicle managing module 131 manages information on the vehicles of the pickup and delivery agents, which will be referred to as vehicle information. The vehicle information includes the kind of vehicle and operation conditions of the vehicle. The GIS system module 132 manages GIS information. The vehicle monitoring and controlling basic information module 133 stores pickup and delivery information, address information, map information, pickup and delivery statistic information, and pickup and delivery vehicle tracing information. The vehicle terminal interface module 134 transmits/receives pickup and delivery information and location information to and from the terminal.

The monitoring sub-system 140 includes a GIS information display module 141, a map plus module 142, a GIS monitoring module 143, a planned sequence display module 144, a vehicle tracing module 145, and a pickup and delivery state managing module 146.

The GIS information display module 141 displays GIS information of the roads, buildings and addresses on the map. The map plus module 142 is a map engine which shows geographical information on a monitor. The GIS monitoring module 143 monitors the state of pickup and delivery and traces the vehicle on a GIS map in real-time. The planned sequence display module 144 displays the planned sequence generated in the planned sequence generating module 121 on the map. The vehicle tracing module 145 traces the vehicle of the pickup and delivery agents on the map when pickup and delivery are actually carried out based on the planned sequence. The pickup and delivery state managing module 146 manages information on the pickup and delivery executed by the pickup and delivery agents.

The transmitting sub-system 150 includes a pull-down module 151 and a push-up module 152. The pull-down module 151 brings in information on address and registration number lists for the pickup and delivery parcels of the day from the external system, and a push-up module 152 transmits the result of the pickup and delivery of the day to the external system.

The operation sub-system 160 includes a vehicle information managing module 161, a terminal managing module 162 operated on the spot, a communication fault processing module 163, and a user information managing module 164.

The vehicle information managing module 161 manages information on the pickup and delivery vehicle, such as driving information and registration information. The terminal managing module 162 manages the terminal on the spot. The communication fault processing module 163 manages logging information having various circumstances and fault conditions generated during the communication and data exchange between an internal system of the intelligent parcel monitoring and controlling apparatus, the intelligent parcel monitoring and controlling apparatus, and the terminal or between the intelligent parcel monitoring and controlling apparatus and the external system. The user information managing module 164 manages user information such as registered pickup and delivery agents and an operator.

The parcel monitoring and controlling database 170 stores and manages destination/delivery information, GIS information such as map information, road information and address information, basic information including planned sequence, vehicle tracing, vehicle information, personnel information of the pickup and delivery agents, and work processing information.

The mobile pickup/delivery sub-system 180 includes a GPS information managing module 181, a terminal GIS monitoring module 182, a terminal pickup and delivery result processing module 183, a transceiving module 184, and a pickup request processing module 185.

The GPS information managing module 181 receives GPS information from the GPS satellite and obtains and manages location information in need. The terminal GIS monitoring module 182 manages the actual state of pickup and delivery and the vehicle tracing information in the terminal. The terminal pickup and delivery result processing module 183 processes and manages pickup and delivery result. The transceiving module 184 transmits pickup and delivery information, such as pickup and delivery result and location of the pickup and delivery agents to the intelligent parcel monitoring and controlling apparatus and receives a response from it. The pickup request processing module 185 receives and processes a new pickup request from the intelligent parcel monitoring and controlling apparatus in real-time.

The terminal database 190 stores and manages stores and manages pickup and delivery state information, location information, and pickup and delivery related information such as command information and GIS information.

Figure 3:
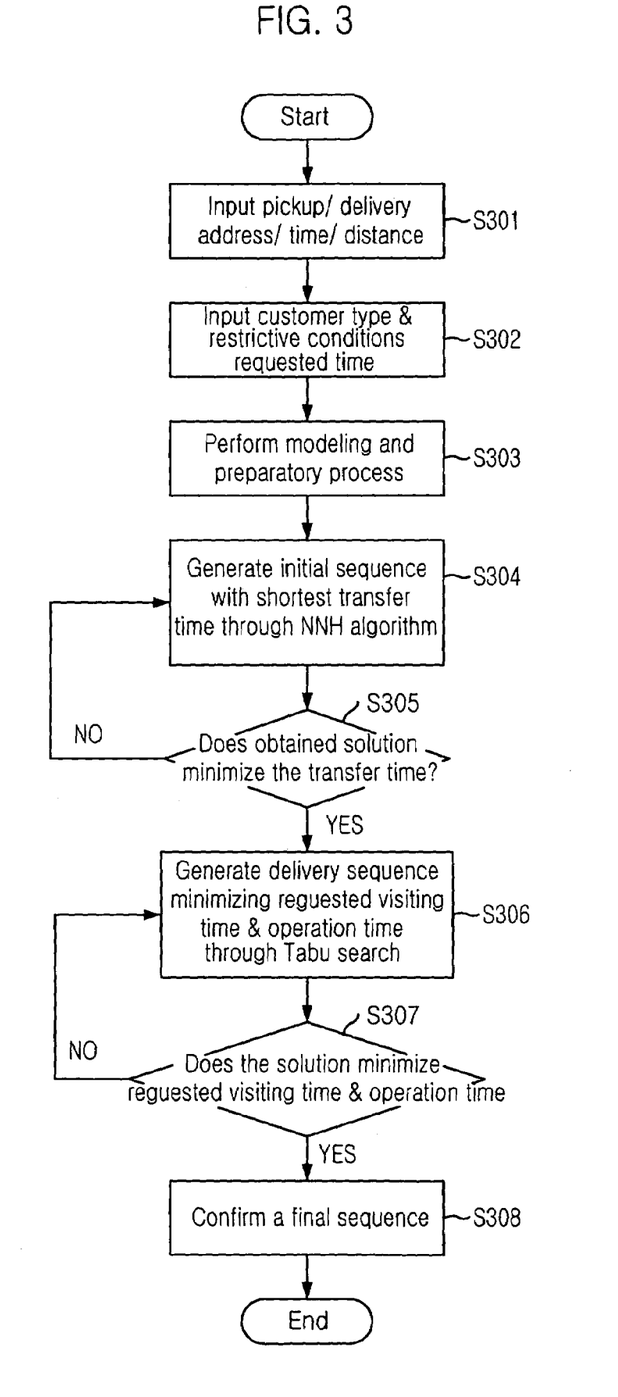
FIG. 3 is a flowchart depicting a method for generating the optimum sequence for pick-up and delivery in accordance with an embodiment of the present invention.

FIG. 3 is a flowchart depicting a method for generating the optimum sequence for pick-up and delivery in accordance with an embodiment of the present invention.

At step S301, pickup and delivery addresses, requested pickup and delivery time, GIS-based time and distance are inputted. At step S302, a type of customers, i.e., general customers, contracted customers or customers of a great deal of parcels, and restrictive conditions such as requested visiting time are inputted. At step S303, input data go through modeling and preparatory process.

Subsequently, at step S304, an initial sequence with shortest transfer time is generated through a widely known Nearest Neighbor Heuristic (NNH) algorithm, which generates the shortest distance by generating a distance closest to a fiducial point. At step S305, it is determined whether a sequence obtained from the NNH algorithm makes the transfer time the shortest.

If the obtained sequence does not produce the shortest transfer time, the logic flow goes to the step S304.

Meanwhile, if the obtained sequence produces the shortest transfer time, at step S306, a sequence that minimizes the requested visiting time and operation time is computed based on the sequence that minimizes the transfer time by using a Tabu Search algorithm, a widely known algorithm which produces a solution with respect to a minimum case after comparing all possible cases for arbitrary fiducial points.

Subsequently, at step S307, it is determined whether the sequence obtained from the Tabu Search algorithm satisfies the conditions of shortest requested time and shortest operation time.

If the sequence proves not to minimize the requested time and the operation time at step S307, the logic flow goes to the step S306.

Otherwise, if it proves to minimize the requested time and the operation time at step S307, at step S308, a final sequence is generated and verified by performing addition, deletion, and adjustment on the optimum sequence which is obtained finally.

Figure 4:
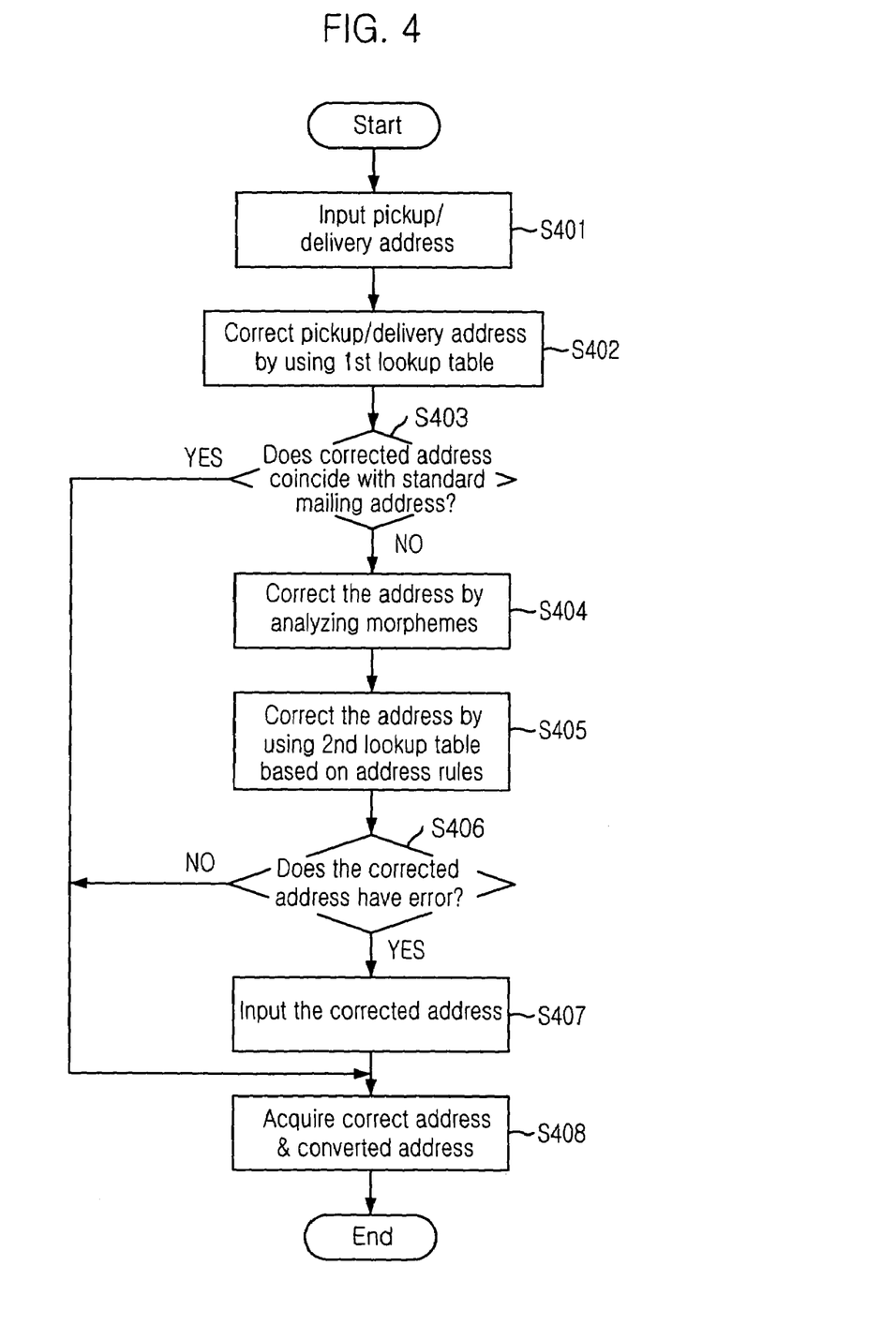
FIG. 4 is a flowchart describing a process for correcting an error in pickup and delivery addresses in accordance with an embodiment of the present invention.

FIG. 4 is a flowchart describing a process for correcting an error in pickup and delivery addresses in accordance with an embodiment of the present invention.

As illustrated in FIG. 4, at step S401, pickup and delivery addresses are inputted and, at step S402, the pickup and delivery addresses are corrected automatically through a first address lookup table which is constructed based on a database.

Subsequently, at step S403, it is determined whether there is an error between pre-established standard mailing addresses and the corrected addresses.

If no error is found at the step S403, at step S408, correct pickup and delivery addresses are acquired.

Meanwhile, if the corrected addresses do not coincide with the pre-established standard mailing addresses (which signifies the corrected addresses have an error) at the step S403, at step S404, morphemes of the corrected addresses are analyzed to figure out which forms the pickup and delivery addresses have among province, city, kun/ku, and dong/ri, and the pickup and delivery addresses are corrected based on regulations for each morpheme.

Subsequently, at step S405, the pickup and delivery addresses are corrected automatically through a second address lookup table which is constructed based on address rules, e.g., firm names and institute names. At step S406, it is determined finally whether the corrected addresses have an error.

If the corrected addresses prove to have no error (which means the corrected addresses are correct addresses) at the step S406, at step S408, converted pickup and delivery addresses are acquired.

If the corrected addresses prove to have an error (which means the corrected addresses are wrong addresses) at the step S406, at step S407, the pickup and delivery addresses are corrected by the user and the corrected addresses are stored in the database. Then, at the step S408, converted pickup and delivery addresses are acquired from the inputted result of correction.

Figure 5A:
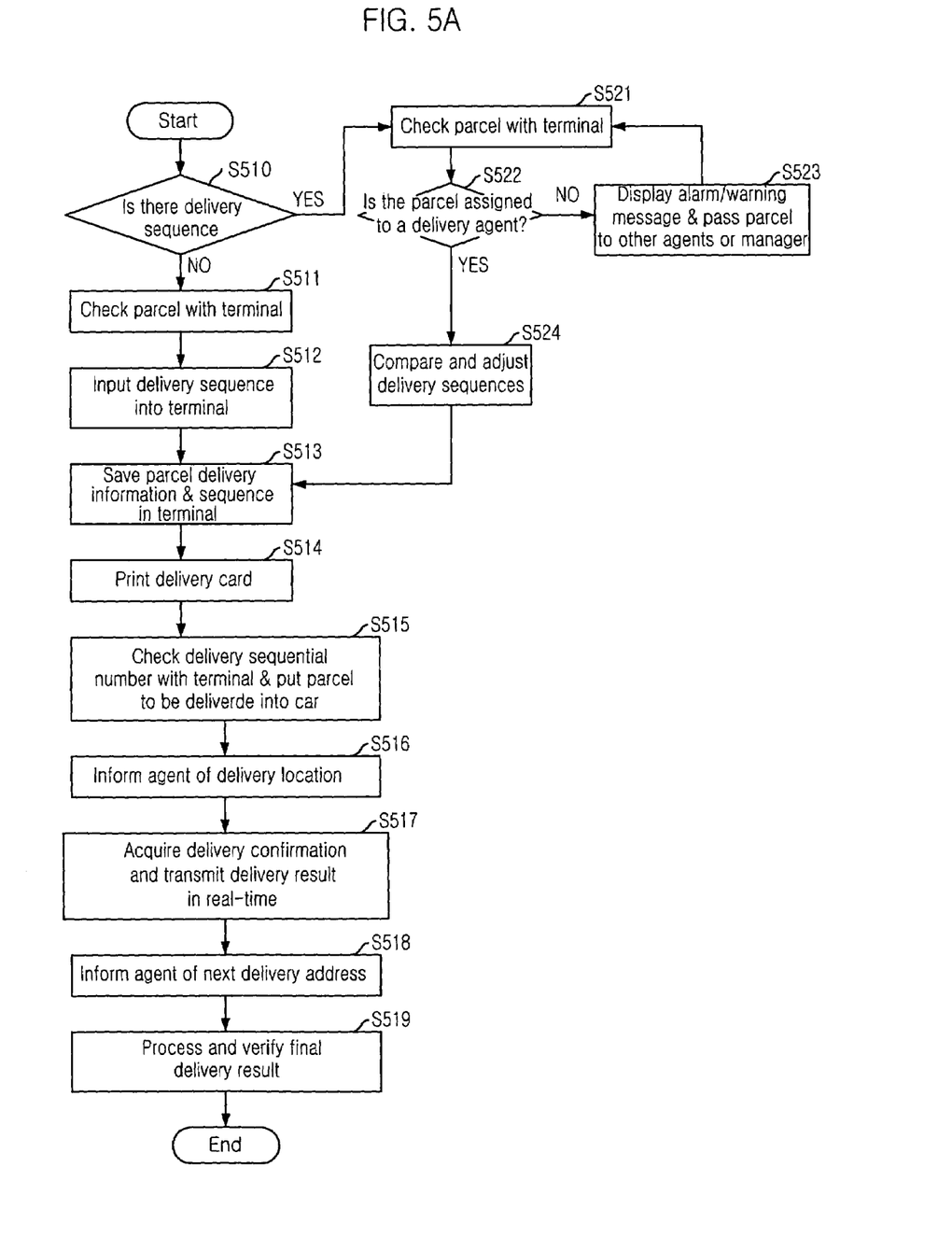
FIG. 5A is a flowchart showing a delivery process in accordance with an embodiment of the present invention.

FIG. 5A is a flowchart showing a delivery process in accordance with an embodiment of the present invention.

As shown, at step S510, it is determined whether there is a delivery sequence.

If it turns out that there is no delivery sequence at the step S510, at step S511, parcels to be delivered are checked by scanning the bar codes on them. Then, at step S512, a delivery sequence is inputted into and saved in the terminal by a delivery agent and, at step S514, the delivery cards are printed out.

Subsequently, at step S515, delivery sequential number saved in the terminal is confirmed and parcels to be delivered are put into the delivery car. At step S516, location of delivery destinations are informed to the delivery agent though the GIS of the terminal, while delivery is executed. At step S517, safe delivery is confirmed by acquiring signatures of those who receive the parcels and the delivery result information is transmitted from the terminal to the intelligent parcel monitoring and controlling apparatus in real-time.

Subsequently, at step S518, the delivery sequential number and address of the next parcel to be delivered are informed to the delivery agent through the GIS of the terminal. At step S519, the final delivery result is processed and verified after all parcels are delivered.

Meanwhile, if it turns out that there is a delivery sequence at the step S510, at step S521, parcels to be delivered are checked with the terminal. Then, at step S522, it is checked whether the parcels are assigned to the delivery agent.

If it turns out that the parcels are not those assigned to the delivery agent at the step S522, at step S523, an alarm and warning message is displayed and the parcel is passed to other delivery agent or a manager for re-assignment to the right agent and then the logic flow goes back to the step S521. If the parcels are those assigned to the delivery agent, at step S524, their delivery sequences are compared with each other and adjusted and the logic flow goes to a step S513 where parcel delivery information and sequence are saved in the terminal.

Figure 5B:
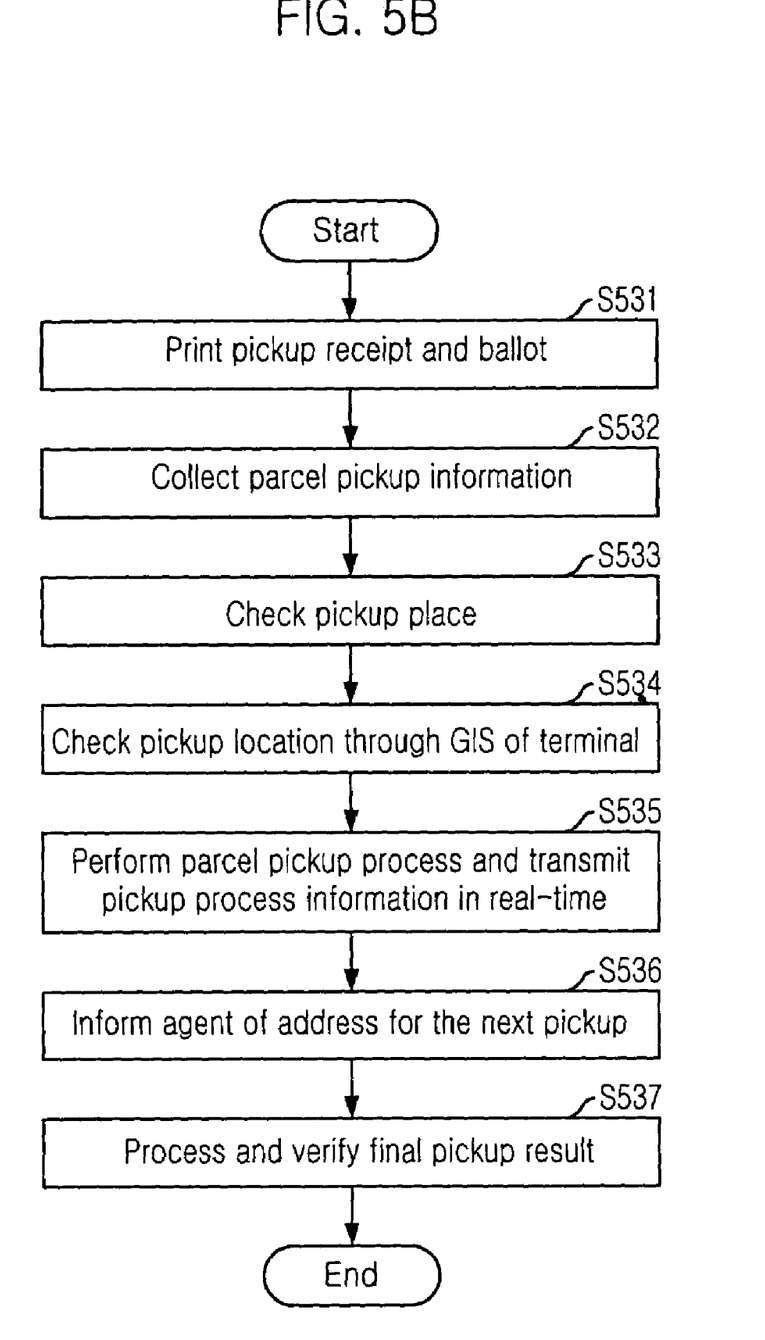
FIG. 5B is a flowchart depicting a pickup process in accordance with an embodiment of the present invention.

FIG. 5B is a flowchart depicting a pickup process performed in the terminal in accordance with an embodiment of the present invention.

As depicted, at step S531, pickup receipts and ballots are printed. At step S532, parcel pickup information is collected by using the terminal and, at step S533, pickup places are checked by using the terminal.

Subsequently, at step S534, pickup locations are informed through the GIS of the terminal during the parcel pickup. At step S535, pickup process such as pickup approval, printing of pickup receipt and label printing is performed and, at step S535, the pickup process information is transmitted simultaneously in real-time.

Subsequently, at step S536, the next pickup place and address are informed to the pickup agent and, at step S537, the finial pickup result is processed and verified in the terminal after the pickup is finished.

Figure 6:
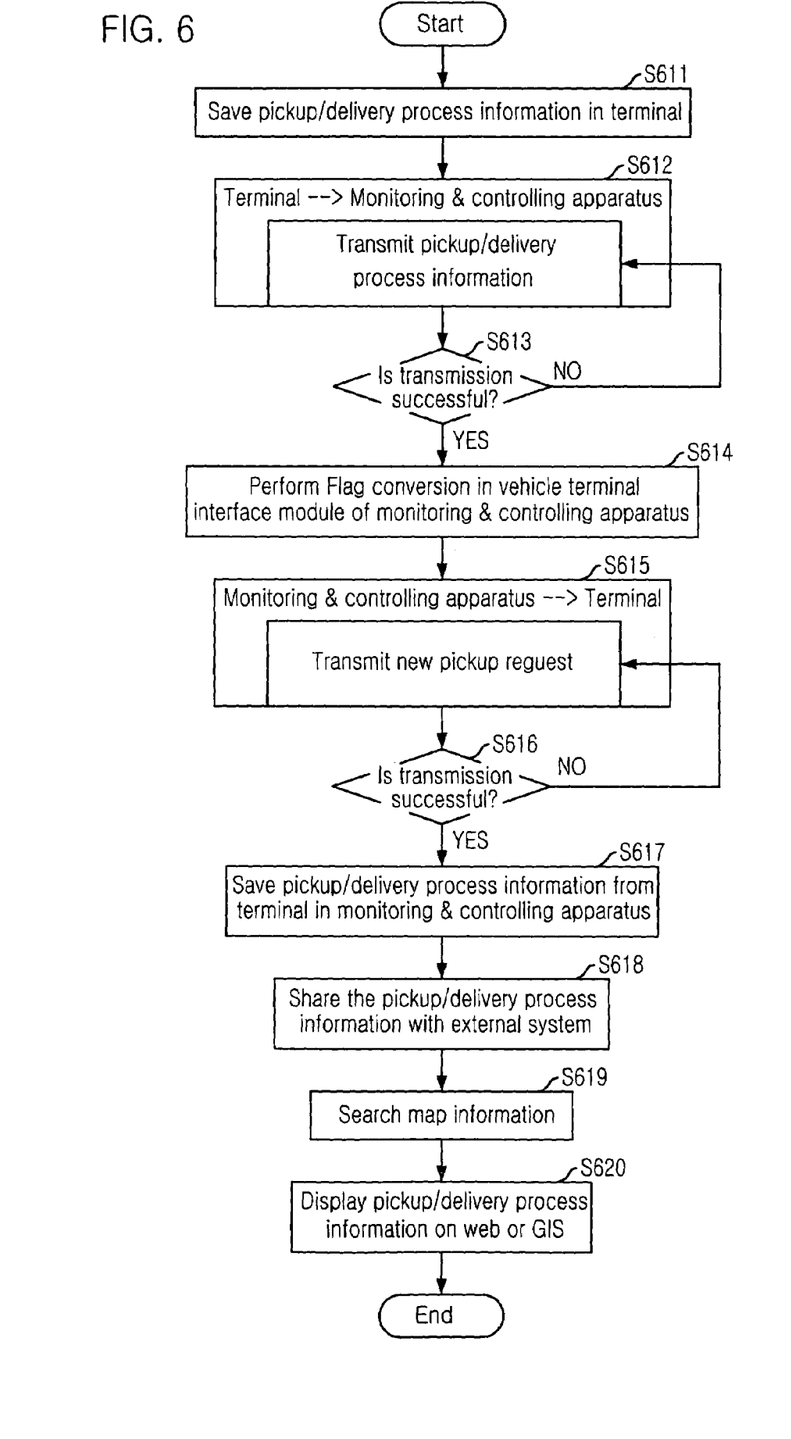
FIG. 6 is a flowchart describing a process of transmitting information real-time in accordance with an embodiment of the present invention.

FIG. 6 is a flowchart describing a process of transmitting information real-time in accordance with an embodiment of the present invention.

As shown, at step S611, pickup and delivery process information is saved in a pickup/delivery result processing module 183 in the terminal. At steps S612 and S613, the pickup and delivery process information is transmitted from the terminal to the intelligent parcel monitoring and controlling apparatus in real-time through a socket communication and if the transmission is successful, at step S614, a flag indicating whether the transmission is successful or not is converted in the vehicle terminal interface module 134 of the intelligent parcel monitoring and controlling apparatus.

Subsequently, if the intelligent parcel monitoring and controlling apparatus has a new pickup request, at steps S615 and S616, the new pickup request is transmitted from the intelligent parcel monitoring and controlling apparatus to the terminal through the socket communication. Then, at step S617, the pickup and delivery process information, which is transmitted from the terminal in real-time, is saved in the intelligent parcel monitoring and controlling apparatus.

Subsequently, at step S618, the pickup and delivery process information is shared with an external system. The saving process is performed in the vehicle tracing module 143. At step S619, map information is searched in a monitoring interface module of the intelligent parcel monitoring and controlling apparatus and, at step S620, the pickup and delivery process information is displayed based on the Web and the GIS in the monitoring interface module of the intelligent parcel monitoring and controlling apparatus.

Figure 7:
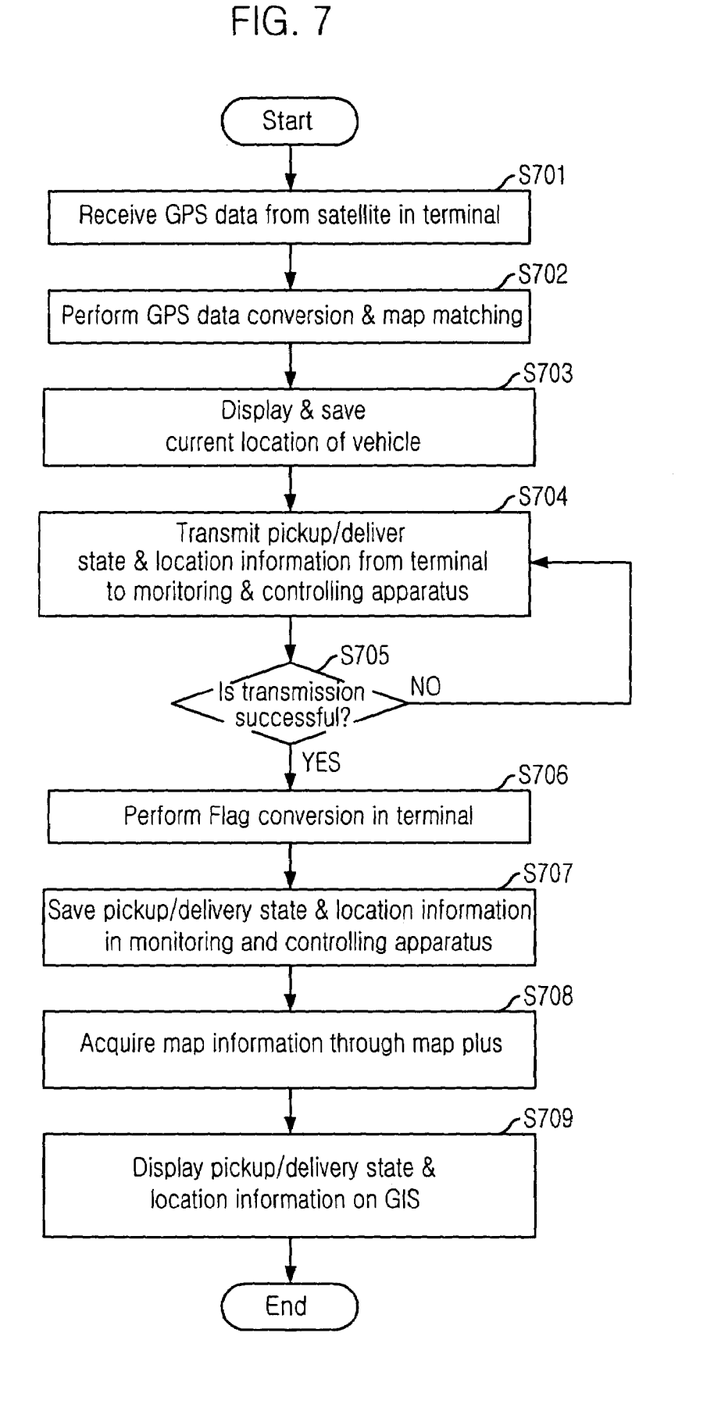
FIG. 7 is a flowchart showing a real-time monitoring process in accordance with an embodiment of the present invention.

FIG. 7 is a flowchart showing a real-time monitoring process in accordance with an embodiment of the present invention.

As shown, at step S701, the terminal receives GPS data from a satellite to monitor and trace the pickup and delivery state in real-time and, at step S702, the GPS data are converted and map-matched in a location detection interface module of the terminal. At step S703, the current location of the pickup and delivery vehicle is displayed on the GIS and saved, which is performed in the GIS monitoring module of the terminal. At steps S74 and S75, the pickup and delivery state and location information are transmitted from the terminal to the intelligent parcel monitoring and controlling apparatus in real-time through the socket communication and if the transmission is successful, at step S706, the flag is converted in the transceiving module 184 of the terminal.

Subsequently, at step S707, pickup and delivery state and the location information is saved in the vehicle terminal interface module 134 of the intelligent parcel monitoring and controlling apparatus. At step S708, map information is acquired through Map Plus in the map plus module 142 of the intelligent parcel monitoring and controlling apparatus and, at step S709, the pickup and delivery state and the location information are displayed on the GIS in the GIS monitoring module of the intelligent parcel monitoring and controlling apparatus.

Figure 8A:
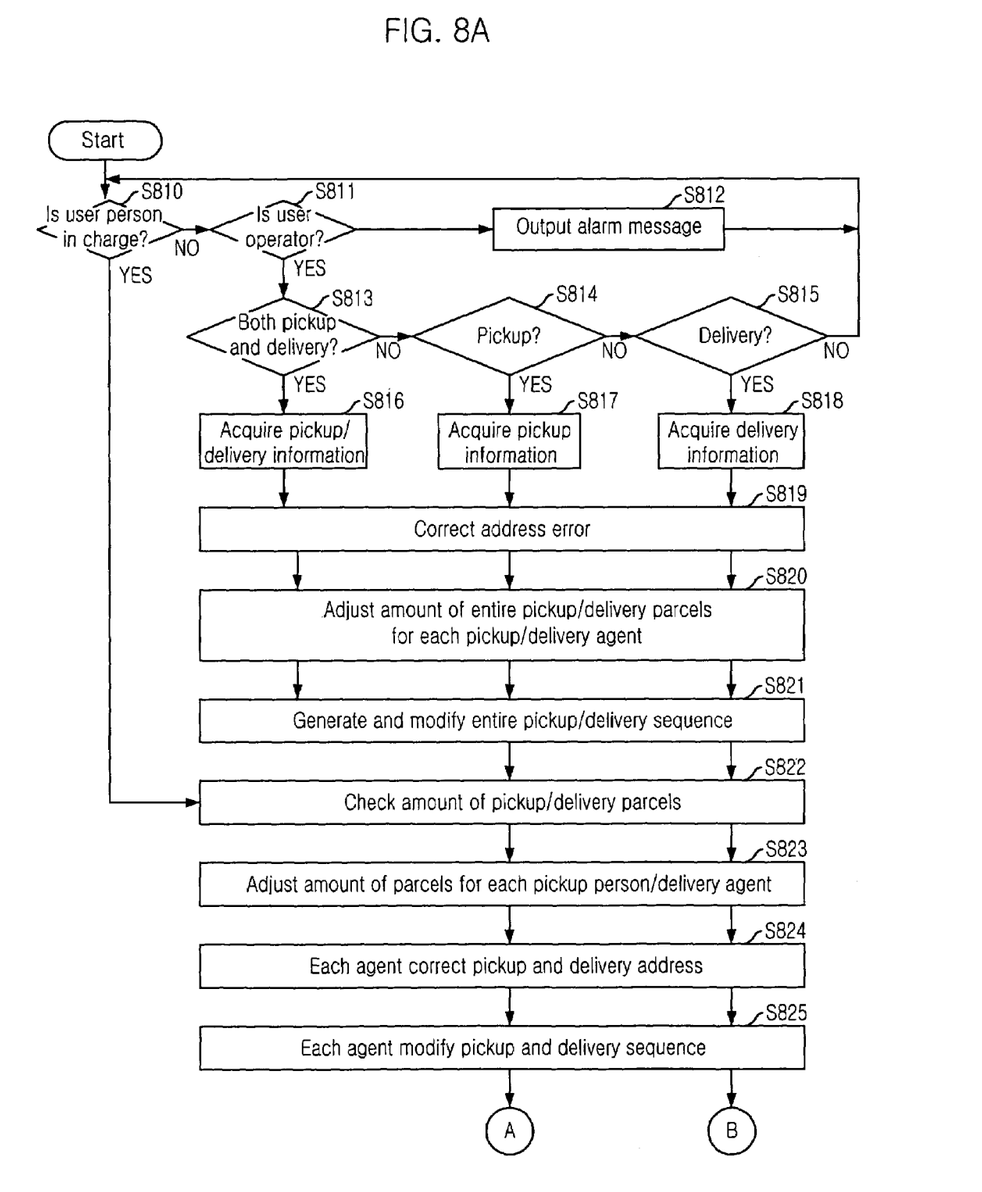
FIGS. 8A and 8B are flowcharts describing a process of planning and executing pickup and delivery in accordance with an embodiment of the present invention.
Figure 8B:
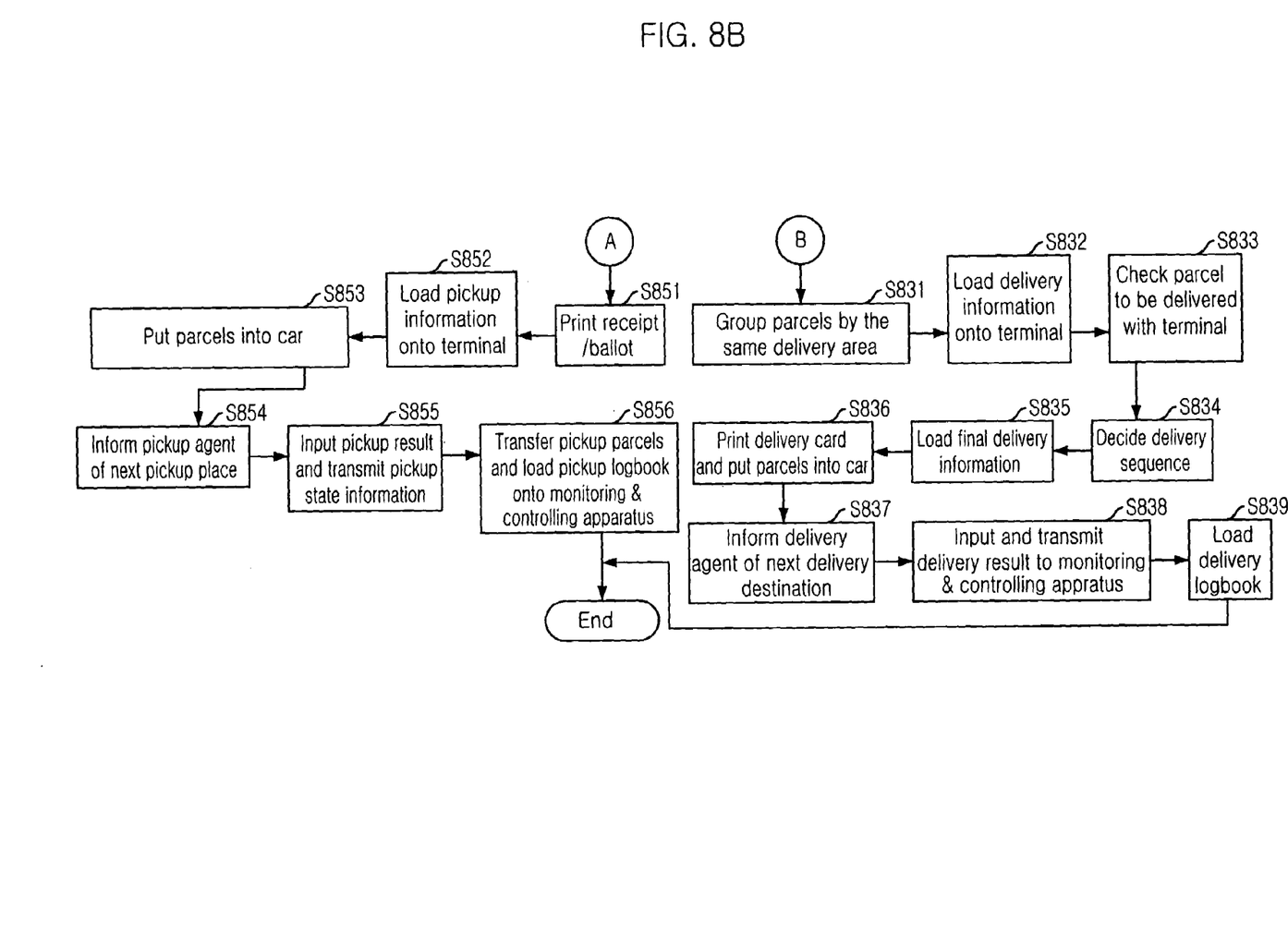

FIGS. 8A and 8B are flowcharts describing a process of planning and executing pickup and delivery in accordance with an embodiment of the present invention.

At step S810, it is determined by a parcel manager who are in charge of managing the pickup and delivery of the parcels whether the user is a pickup and delivery agent in charge of a parcel. If the user is not a responsible pickup and delivery agent, at step S811, it is checked whether the user is an operator. If the user is not the operator either, at step S812, an alarm message is outputted and the logic flow goes to the step S810. If the user is the operator, at steps S813 through S815, the process is divided into cases of both pickup and delivery, pickup, and delivery. At steps S816 through S818, the entire pickup and delivery information, the entire pickup information or the entire delivery information is acquired.

Subsequently, at step S819, address errors of the informations are corrected and, at step S820, the amount of pickup and delivery is adjusted for each pickup or delivery agent. At step S821, a pickup and delivery sequence is generated and modified and then the logic flow goes to step S822.

At step S810, if the user is a responsible pickup and delivery agent, at step S822, it is checked how much parcels for pickup and delivery are assigned for each pickup and delivery agent. At step S823, the amount of pickup and delivery parcels is adjusted for each pickup and delivery agent. The steps S810 to S823 are for the parcel manager, while steps S824 and subsequent steps are for each parcel pickup/delivery agent. At step S824, the pickup and delivery addresses are corrected by each agent and, at step S825, the pickup and delivery sequences are modified by each agent.

Subsequently, in case of a work of pickup, at step S851, first pickup receipts and ballots are printed and, at step S852, pickup information is loaded onto the terminal. At step S853, a parcel is picked up and put into a car. At step S854, the next pickup place is informed to the pickup agent through the GIS of the terminal and, at step S855, pickup result is inputted and pickup state information is transmitted to the intelligent parcel monitoring and controlling apparatus in real-time. At step S856, the parcels that are picked up are passed to other people for the subsequent processes and a pickup logbook is loaded onto the intelligent parcel monitoring & controlling apparatus.

Meanwhile, in case of the delivery work, at step S831, parcels are grouped for the same delivery area and, at step S832, delivery information is loaded onto the terminal. At step S833, parcels to be delivered are checked and arrayed by using the terminal. At step S834, a final delivery sequence is determined and, at step S835, final delivery information is loaded. At step S836, delivery cards are printed and the parcels to be delivered are put into a delivery car according to the delivery sequence.

Subsequently, at step S837, the next delivery destination is informed to the delivery agent through the GIS of the terminal during the delivery and, at step S838, delivery result is inputted to the terminal and transmitted to the intelligent parcel monitoring and controlling apparatus in real-time. At step S839, a parcel delivery logbook is loaded onto the terminal.

The technology of the present invention can reduce logistics cost for companies of postal parcel delivery service and/or door-to-door parcel delivery service by reducing time for pickup and delivery and improving work efficiency, as it plans, executes and monitors and controls parcel pickup and delivery processes quickly and accurately.

The technology of the present invention can be applied to the development of pickup and delivery management and monitoring systems for the parcel delivery service and door-to-door delivery service, and it can also be applied to the development of a major core module of a system for planning, execution, guiding and monitoring parcel delivery and to its cooperation with other modules.

While the present invention has been described with respect to certain preferred embodiments, it will be apparent to those skilled in the art that various changes and modifications may be made without departing from the scope of the invention as defined in the following claims.

What is claimed is:

1. An intelligent parcel monitoring and controlling apparatus for monitoring and controlling parcel delivery in real-time, comprising:
    an address correcting means for acquiring correct pickup and delivery addresses by determining whether the pickup and delivery addresses have an error;
    a planned sequence generating and managing means for generating and managing an optimum pickup and delivery sequence in a form of Geographical Information System (GIS) data based on the correct pickup and delivery addresses acquired in the address correcting means;
    a terminal monitoring and controlling means for transmitting pickup and delivery information which includes an amount pickup and delivery parcels, pickup and delivery sequences, pickup and delivery addresses and requested time to a terminal of a pickup/delivery agent and receiving pickup and delivery state information and location information from the terminal, the terminal monitoring and controlling means being connected to the terminal through a communication network;
    a monitoring means for displaying monitoring information which is obtained based on the pickup and delivery state information and the location information that are transmitted from the terminal along with geographical information of a region where the terminal is located; and
    an information storing and managing means for storing and managing information related to pickup and delivery which includes door-to-door delivery information, planned sequence information, vehicle tracing information, work processing information, GIS information including map information, road information and address information, and vehicle information.

2. The apparatus as recited in claim 1, wherein the address correcting means includes:
    an address input/output means for receiving the pickup and delivery addresses and outputting converted addresses;
    an error correcting means for determining whether there is an error in the pickup and delivery addresses which is inputted in the address input/output means and if there is an error, acquiring the converted addresses by correcting the error; and
    a standard address storing means for managing standard information for determining whether the pickup and delivery addresses have an error or not in the error correcting means.

3. The apparatus as recited in claim 2, wherein the planned sequence generating and managing means includes:
    a planned sequence generating means for generating the optimum pickup and delivery sequences based on inputted pickup and delivery addresses, distance, requested pickup and delivery time;
    a planned sequence managing means for managing the pickup and delivery sequences generated in the planned sequence generating means and actual pickup and delivery sequences; and
    a planned sequence basic information managing means for storing and managing basic information required to generate the planned pickup and delivery sequences in the planned sequence generating means, the basic information including pickup and delivery addresses, GIS information, requested pickup and delivery time.

4. The apparatus as recited in claim 3, wherein the terminal monitoring and controlling means includes:
    a vehicle managing means for managing vehicle information of the pickup/delivery agent, the vehicle information includes a kind of vehicle and operation conditions;
    a GIS managing means for managing GIS data;
    a vehicle monitoring and controlling information managing means for storing and managing vehicle monitoring and controlling information for monitoring and controlling the vehicle, the vehicle information including pickup and delivery command information, address information, map information, pickup and delivery static information, and vehicle tracing information; and
    a terminal interfacing means for transmitting/receiving pickup and delivery information and location information to and from the terminal.

5. The apparatus as recited in claim 4, wherein the monitoring means includes:
    a GIS information displaying means for displaying geographical information including roads, buildings and address on a map;
    an engine managing means for managing map engine which displays the geographical information on a monitor;

a GIS monitoring means for monitoring the trace of the vehicle and actual pickup and delivery conditions on a GIS map;

a planned sequence displaying means for displaying the planned sequence generated in the planned sequence generating means on the map;

a vehicle trace displaying means for displaying the trace of the vehicle on the map while the pickup/delivery agent execute pickup and delivery; and a pickup and delivery state managing means for managing pickup and delivery state information inputted by the pickup/delivery agent.

6. The apparatus as recited in claim 1, further comprising:

an external system connecting means for receiving pickup and delivery amount information including address, registration number, and requested time from an external system and transmitting pickup and delivery result information to the external system; and an operation means for providing a user with a function of operating the intelligent parcel monitoring and controlling apparatus by operating and managing a system so that the user can access to data and acquire desired data.

7. The apparatus as recited in claim 6, wherein the external system operating means includes:

a receiving means for receiving the pickup and delivery amount information including address, registration number and requested time from the externals system; and a transmitting means for transmitting pickup and delivery result to the external system.

8. The apparatus as recited in claim 7, wherein the operation means includes:

a vehicle information managing means for managing vehicle information including vehicle operating information and vehicle registration information;

a terminal managing means for managing the terminal;

a communication fault processing means for managing logging information including various conditions and fault conditions caused during the communication and data exchange between internal constitutional elements of the intelligent parcel monitoring and controlling apparatus, between the intelligent parcel monitoring and controlling apparatus and the terminal, or between the intelligent parcel monitoring and controlling apparatus and the external system; and a user information managing means for managing user information.

9. An intelligent parcel monitoring and controlling method for monitoring and controlling parcel pickup and delivery in real-time, comprising the steps of:

a) storing information used for parcel pickup and delivery;

b) correcting an address error;

c) generating optimum pickup and delivery sequences;

d) transmitting pickup and delivery command information to a terminal of a pickup/delivery agent;

e) receiving pickup and delivery state information and location information from the terminal;

f) monitoring parcel pickup and delivery in real-time; and g) storing pickup and delivery state information.

10. The method as recited in claim 9, wherein the step of b) includes a step of:

b1) correcting pickup and delivery addresses automatically based on a first standard address information.

11. The method as recited in claim 10, wherein the step of b) further includes the steps of:

b2) determining whether there is an error by comparing the corrected addresses with standard postal address information;

b3) if no error is found in the corrected addresses, acquiring the corrected addresses as accurate addresses; and b4) if an error is found in the corrected addresses, re-correcting the corrected addresses by analyzing morphemes of the addresses based on regulations on morphemes.

12. The method as recited in claim 11, wherein the step of b) further includes the step of:

b5) correcting the pickup and delivery addresses automatically based on a second standard address information which includes accurate addresses based on firm name and institute name.

13. The method as recited in claim 12, wherein the step of b) further includes the steps of:

b6) determining whether there is an error in the corrected addresses based on the second standard address information;

b7) if no error is found in the corrected addresses, acquiring converted pickup and delivery addresses;

b8) if an error is found in the corrected addresses, re-correcting the corrected addresses from a user and adding the re-corrected addresses in a database; and b9) acquiring the re-corrected addresses as converted addresses.

14. The method as recited in claim 9, wherein the step of c) includes the steps of:

c1) receiving pickup and delivery addresses, requested pickup and delivery time, and GIS-based time and distance;

c2) receiving restrictive conditions including the type of customer and requested visiting time;

c3) generating a sequence solution that minimizes transfer time by using Nearest Neighbor Heuristic (NNH) algorithm;

c4) generating a sequence solution that minimizes requested visiting time and operation time by using Tabu Search algorithm; and c5) generating, checking and verifying the optimum sequences by performing addition, deletion and/or adjustment with respect to the sequence solution obtained from the Tabu Search algorithm.

* * * * *